(12) United States Patent
Fritzinger et al.

(10) Patent No.: US 6,407,353 B1
(45) Date of Patent: Jun. 18, 2002

(54) TRAILER BREAKAWAY SWITCH ASSEMBLY AND PULL-PIN ACTUATOR THEREFOR

(76) Inventors: Daniel D. Fritzinger, 11917 Saint Joe Rd., Grabill, IN (US) 46741; David J. Rowland, 8002 Pebble Creek Pl., Fort Wayne, IN (US) 46835

( * ) Notice: Subject to any disclaimer, the term of this patent is extended or adjusted under 35 U.S.C. 154(b) by 0 days.

(21) Appl. No.: 09/433,909

(22) Filed: Nov. 4, 1999

(51) Int. Cl.[7] .............................................. H01H 27/00
(52) U.S. Cl. .................... 200/334; 200/43.04; 200/537; 200/61.14
(58) Field of Search ........................... 200/17 R, 43.04, 200/52 R, 61.13, 61.14, 61.18, 61.19, 537, 538, 543–546, 573, 574, 329–331, 334

(56) References Cited

U.S. PATENT DOCUMENTS

| | | | |
|---|---|---|---|
| 315,662 A | 4/1885 | Pullman | |
| 372,599 A | 11/1887 | Card | |
| 473,832 A | 4/1892 | Dunn | |
| 2,676,225 A | 4/1954 | Jubell | 200/153 |
| 2,844,675 A | 7/1958 | Edgar | 200/61.19 |
| 2,928,912 A | 3/1960 | Molnar, Jr. | 200/61.19 |
| 3,062,326 A | 11/1962 | Jones et al. | 188/3 |
| 3,654,411 A | 4/1972 | Wohnlich et al. | 200/61.19 |
| 3,681,551 A * | 8/1972 | Smith | 200/161 |
| 3,689,717 A | 9/1972 | Westenhaver | 200/61.19 |
| 3,691,330 A | 9/1972 | Hollander | 200/61.19 |
| 3,733,450 A * | 5/1973 | Ridge et al. | 200/85 R |
| 3,760,134 A * | 9/1973 | McCray | 200/52 R |
| 3,832,501 A | 8/1974 | Amnotte | 200/61.19 |
| 4,037,683 A * | 7/1977 | LeBell | 180/99 |
| 4,271,401 A | 6/1981 | Meo | 340/52 D |
| 5,145,391 A | 9/1992 | Alwine | 439/188 |
| 5,165,530 A * | 11/1992 | Shinohara et al. | 200/314 |

* cited by examiner

Primary Examiner—Michael Friedhofer
(74) Attorney, Agent, or Firm—Price, Heneveld, Cooper, DeWitt & Litton

(57) ABSTRACT

A breakaway switch assembly for detecting the unintended separation of a pair of connected vehicles or the like, of the type having a housing enclosure which slidably receives a pin-type actuator that operates an internal switch when pulled from the housing upon separation of the connected vehicles etc., incorporates a fully assembled, self-contained switch unit of a commercially known type, rather than a special switch assembly having long, resilient contact-carrying spring arms that must be carefully and tediously mounted in specially designed housings, as was the most prevalent practice heretofore. The self-contained switch unit so utilized preferably has an enclosing outer housing or body which protects the interior switch mechanism, contacts, etc., from the elements and also provides protruding flanges or the like which facilitate easy and fast mounting of the entire unit within the housing. Instead of being disposed between the conventional spring-arm electrical contact carriers, and retained in place thereby, the pull-pin operator is self-retained within a tubular receiver passage extending through the housing wall, preferably by resiliently deformable elastomer members such as O-rings, or by spring arms extending from the side of the pull-pin and integrally made as a part thereof. The O-rings when used are mounted on the pull-pin and must compress to pass over ridges formed in the tubular receiver when the pin is pulled out to actuate the switch unit, thus providing an alternative form of resilient biasing between the pin and the housing.

31 Claims, 4 Drawing Sheets

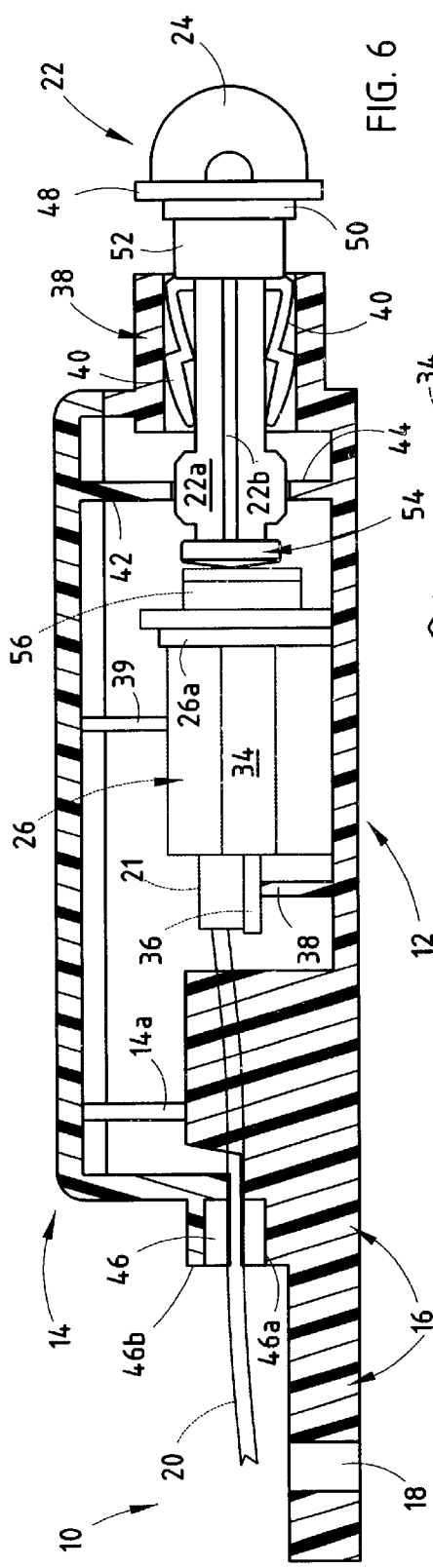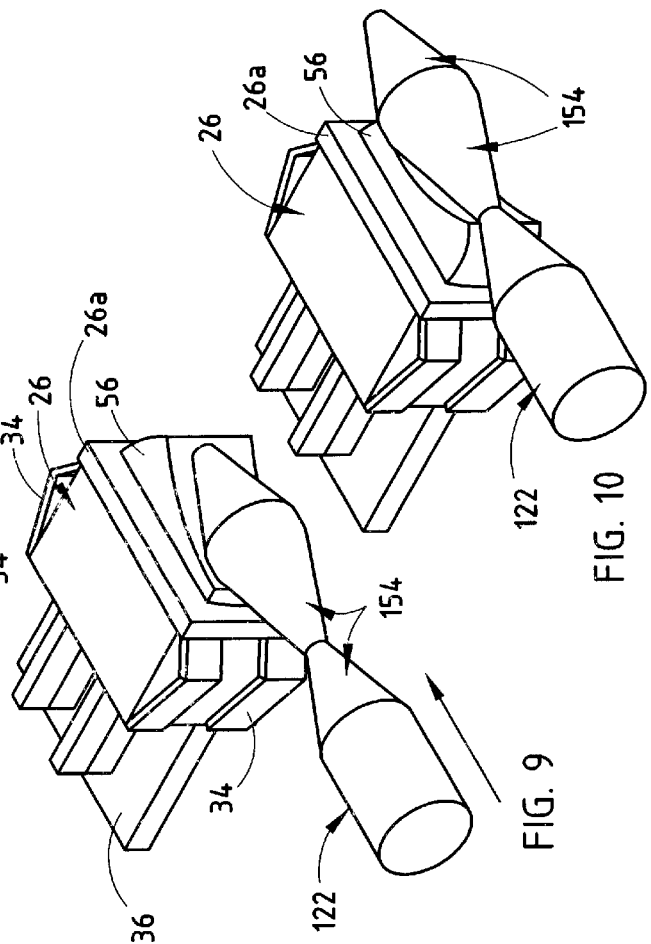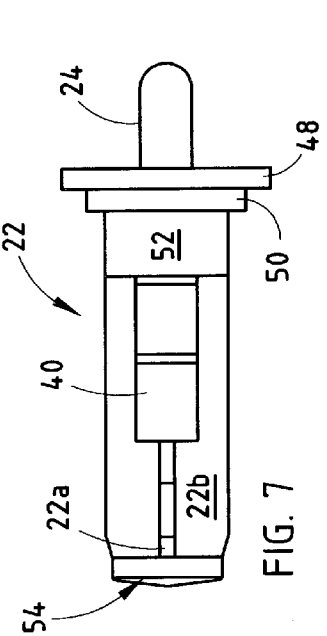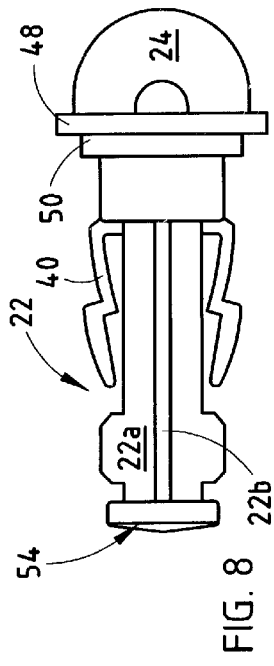

TRAILER BREAKAWAY SWITCH ASSEMBLY AND PULL-PIN ACTUATOR THEREFOR

FIELD OF THE INVENTION

Breakaway switch devices have long been used to detect the unintended separation of a pair of mutually coupled vehicles or other such machines, for example, the separation of a towed vehicle from a towing vehicle such as a trailer and an automotive vehicle pulling the trailer. Various different forms of such devices have been used or considered over time, but the most widely accepted type is one which uses a "pull-pin" or the like that is connected to the towing vehicle and normally carried in an inserted position in a switch housing mounted on the trailer, in which position the pin is disposed between a pair of electrical contacts located inside the housing, to prevent them from contacting one another and allowing current to flow through them. Since the pin is connected to the towing vehicle, the accidental decoupling of the towed vehicle will immediately pull the pin out of the switch housing, allowing the electrical contacts to touch and thereby complete an electrical circuit that can actuate an alarm and/or provide some other such desired result, including the application of brakes on the towed vehicle, as an automatic response.

BACKGROUND OF THE INVENTION

Many or most such breakaway switch devices used in the past have included electrical contacts that are either attached to or comprise an integral part of long, specially shaped blade-type electrically conductive members which not only carried the electrical contacts but also acted as springs. These were specially mounted and retained inside a switch housing so that their end extremities or other contact portions would normally be spring-biased into mutual contact were it not for the pull-pin actuator, which when inserted pushed the two self-biased spring contacts apart to prevent their engagement and thereby maintain the same in open-circuit configuration until the pin was withdrawn.

Switch assemblies of the type just described are expensive to produce since the long spring-type electrical contacts are relatively expensive to manufacture, and they are also difficult and labor-intensive to assemble within the switch housing, as they do not lend themselves to automated assembly and typically require manual assembly. Furthermore, they often do not provide optimal switching operation due to their size, shape, and manner of operation, and are often subject to exposure to the elements, since their corresponding switch housings may not be well sealed. Consequently, the switch contacts may rust and corrode over time, sometimes becoming unreliable and even inoperative at the time upon when they are finally needed. In addition, such spring-contacts may lose their resiliency over time and are also subject to distortion by bending in use, due to the insertion and withdrawal of the pull-pin actuator each time a trailer is coupled and uncoupled. Numerous other disadvantages also attended the use and manufacture of such switch assemblies.

BRIEF SUMMARY OF THE INVENTION

The present invention provides a unique and effective solution for problems such as those noted above in connection with previous types of breakaway switches, providing a new type of breakaway switch assembly of high reliability and long life which is at the same time extremely economical to manufacture and also easy to use.

In a first aspect, the breakaway switch assembly comprises a housing enclosure having a self-contained switch unit disposed inside it which has an internal switch mechanism and an externally accessibly operating member. The self-contained switch unit has an outer body with mounting surfaces that engage switch-retention members inside the housing enclosure to hold the switch unit in predetermined placement therewithin. Input and output conductors are connected to corresponding terminals of the switch unit to carry an electrical current which is switched through the switch unit, such signal conductors extending out of the housing enclosure. An externally accessible actuator extends into the housing enclosure in alignment with the switch-operating member of the switch unit, and the actuator is movable from at least a first position to a second position whereby it moves the switch-operating member into and out of a position causing electrical conduction through the switch unit.

In a preferred embodiment, the self-contained switch unit to be mounted inside the housing enclosure comprises a standard off-the-shelf push-button or rocker-type switch, with integral flanges or the like which are rapidly and easily insertable into place between opposing such flanges provided inside the housing, and the switch unit includes spade-type or other such quick-connect electrical terminals extending from it, by which the electrical conductors used to form the related electrical circuit may be quickly and easily connected to the switch unit during manufacture. In addition, a preferred pull-pin actuator for the assembly comprises an integral one-piece member, preferably molded of non-conductive or other such polymer, to provide a very economically manufactured member of high reliability and easy utilization, and having a structural configuration which includes a portion for directly engaging the switch unit operator (push-button or rocker), to hold it in predetermined position actuating the switch in a desired manner dependent upon the position of the pull-pin.

The foregoing general and preferred attributes of the invention will become increasingly apparent and better understood following consideration of the ensuing specification and claims, taken in conjunction with the attached drawings.

DESCRIPTION OF THE DRAWINGS

FIG. 6 is an enlarged central sectional view of the structure shown in FIG. 5;

FIG. 7 is an enlarged side view of the pull-pin, showing a first side thereof;

FIG. 8 is an enlarged side view of the pull-pin rotated 90° from the position shown in FIG. 7;

FIG. 9 is an enlarged fragmentary perspective view showing a second embodiment of the pull-pin and switch unit, with the pin disposed in a first position;

FIG. 10 is a view like FIG. 9 showing the same structure but with the pull-pin in a second position;

DETAILED DESCRIPTION OF PREFERRED EMBODIMENTS

Figure 1:
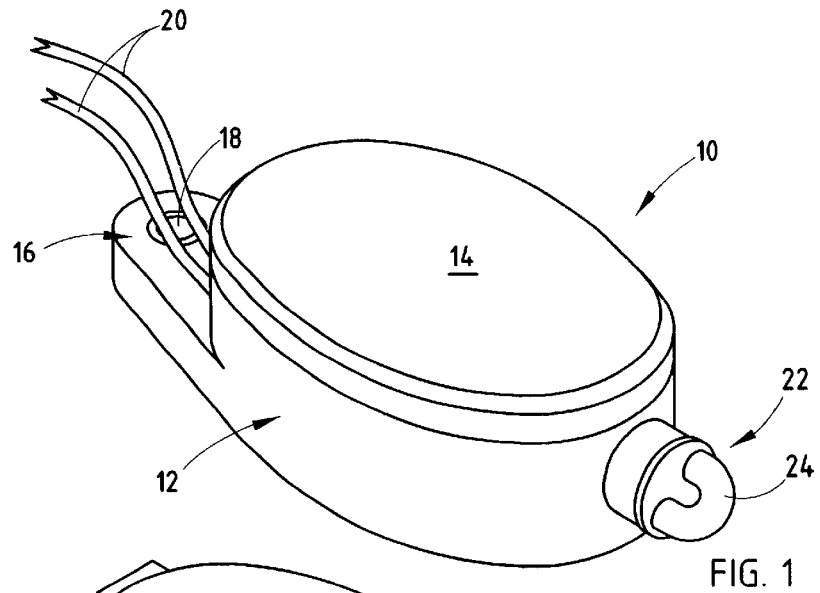
FIG. 1 is a frontal perspective view of a preferred breakaway switch assembly embodiment in accordance with the invention.

FIG. 1 illustrates a breakaway switch assembly 10 in accordance with the invention, shown in fully assembled condition. Basically, switch assembly 10 comprises a partially enclosing main housing 12 and a top closure member 14 therefore, with which it forms a complete housing enclosure. Main housing 12 includes a rearwardly extending portion 16 which is preferably integral with the main housing and which preferably includes a mounting hole 18 by which the housing may be readily mounted to a trailer or the like by a bolt or the like, which if not fully tightened will provide a pivotal mounting for the switch assembly. In addition to the attachment extension 16, a pair of electrical conductors 20 exit the housing enclosure 12, 14 at its rearward extremity, and at the front a pull-pin actuator 22 is seen in fully engaged position. As illustrated, pull-pin 22 preferably includes an open-centered loop-like bail 24 by which it may be secured to a cord or chain, etc. attached to the towing vehicle.

Figure 2:
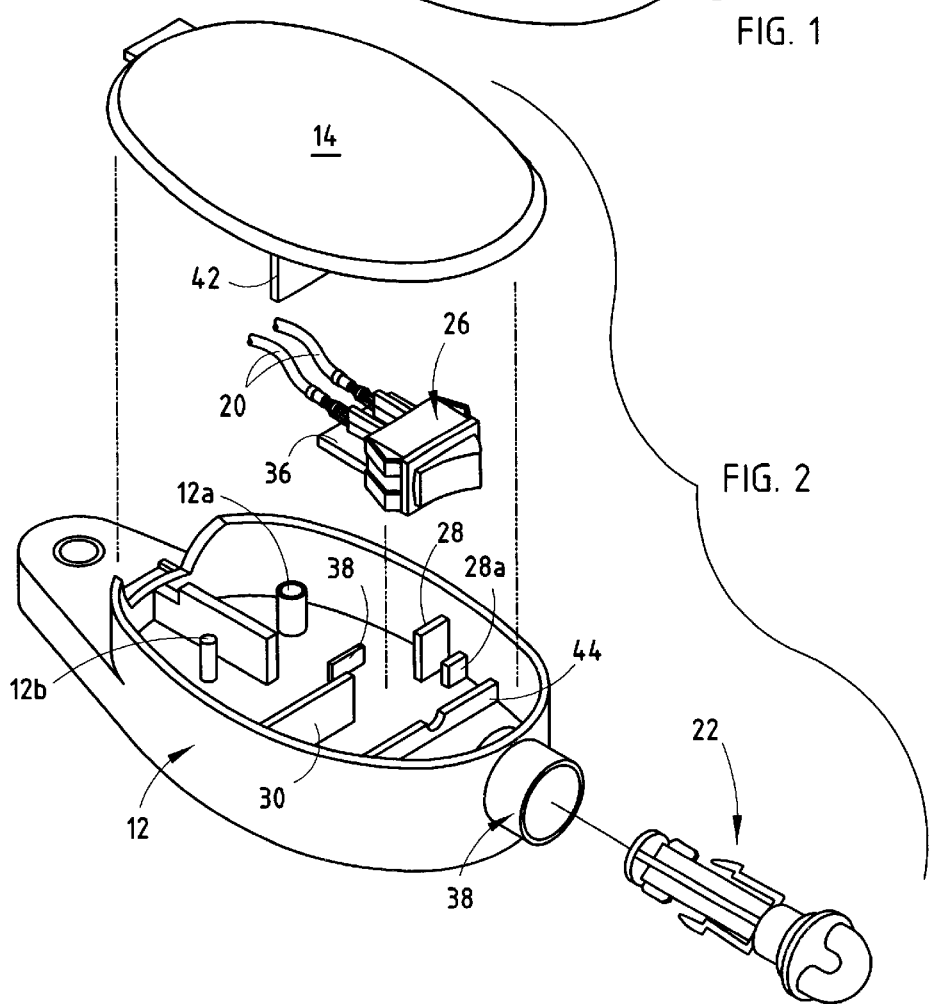
FIG. 2 is an exploded perspective view of the embodiment shown in FIG. 1.

FIG. 2 illustrates the housing top 14 lifted from the main housing 12 to reveal the interior of the latter, and also shows pull-pin 22 withdrawn from housing 12. In addition, FIG. 2 illustrates the preferred type of self-contained switch unit 26, which is easily but securely mountable inside housing 12 by interfitting it between wall-like flanges 28, 28A, and 30 inside housing 12, as further illustrated in FIG. 3. It will be noted that switch unit 26 includes a pair of laterally extending flanges 26a, 26b at opposite sides. Flange 26b nests between housing flanges 28 and 28a, and flange 26a rests flush against housing flange or wall 30. Switch 26 is a self-contained unit, preferably of a type commercially available on an economical basis, such as that sold by CW Industries of Southamton, Pa. and identified as part no. GRS-4011C-XXX (SP/ST, momentary/NC). Preferably, this switch unit includes an outer enclosure or body 32 which integrally forms the mounting flanges 26a, 26b. On opposite sides of switch body 32, adjacent the mounting flanges 26a, 26b, a pair of resiliently deflectable or deformable spring arms 34 may be provided which help secure the switch 26 in a receiving opening, such as that provided between housing flanges 28 and 30. As will be understood by those skilled in the art, switch units such as that just described, including the various physical attributes just noted, are well known in the art and readily available commercially. Of course, the selected switch must have adequate current-carrying capacity for the intended purpose, and where it must carry vehicle brake-actuating current that will likely be in the range of fifteen to thirty amps.

Figure 3:
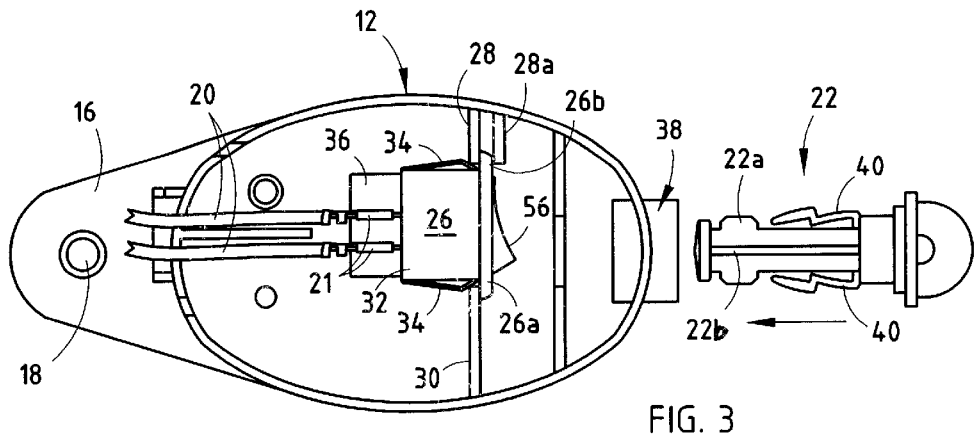
FIG. 3 is an exploded overhead plan view of the apparatus shown in FIGS. 1 and 2, showing the pull-pin in withdrawn position.
Figure 4:
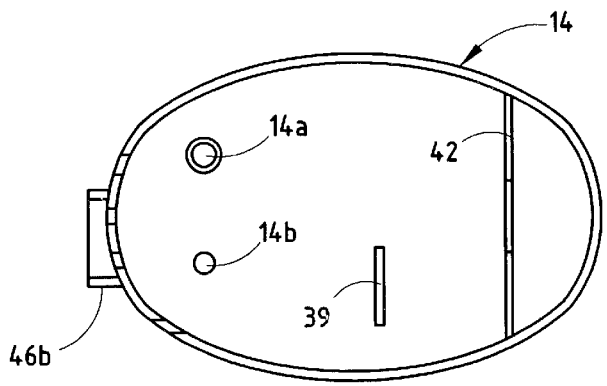
FIG. 4 is a bottom view of,the top closure member for the switch housing.
Figure 5:
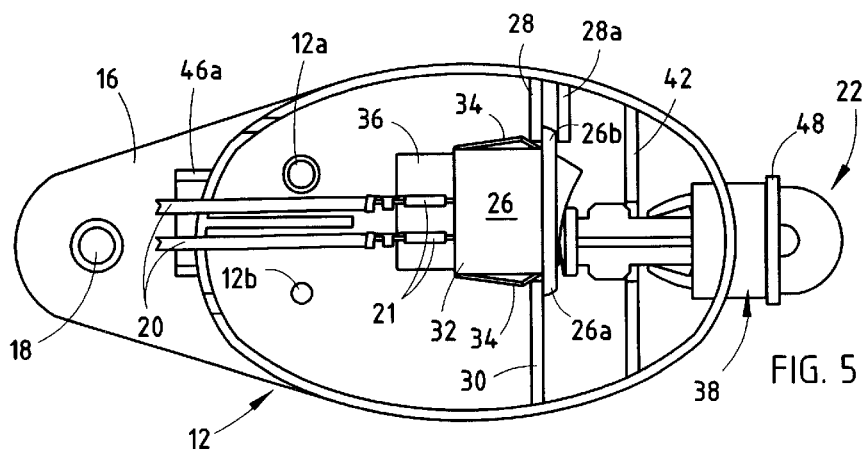
FIG. 5 is an overhead plan view similar to FIG. 3 but showing the pin in fully engaged position.

In the mounted position of switch unit 26, shown in FIGS. 3, 5, and 6, the self-contained unit is securely held in the illustrated position by the various flange walls referred to above, which are disposed in mutual contact, with the spring arms 34 exerting at least light spring force against the end extremities of flanges 28 and 30. Switch body 32 includes a rearwardly projecting shelf-like extremity 36, and this rests upon an upwardly projecting flange wall 38 (FIGS. 2 and 6) that forms an integral part of the main housing 12. The bottom of switch unit 26 (body 32) rests upon the bottom inside surface of main housing 12, and the housing top 14 preferably includes a downwardly projecting wall-like flange whose end extremity bears against the top of switch body 32 when housing top 14 is mounted in place upon the main housing 12 (FIG. 6). Thus, switch unit 26 is securely and reliably captured in place inside the housing enclosure, and has no freedom of movement in any direction. As illustrated, switch unit 26 has a pair of rearwardly extending terminals located directly above the shelf-like projection 36, which may be in the form of spade terminals that slidably receive closely fitting C-shaped crimped-on conductor terminals 21 for easy attachment of the electrical conductors 20 to the switch unit. Conductors 20 are preferably separated along substantially their entire length inside housing 12 by an upright partition wall 13, and the conductors exit housing 12 at the rear, over the top of the rearwardly extending portion 16, in a manner described in more detail subsequently.

Preferably, the partition line between housing top 14 and main housing 12 in the area adjacent pull-pin 22 occurs at a point well above a cylindrically tubular receiver portion 38, which is therefore entirely defined by, or part of, main housing 12 (FIG. 6). Accordingly, receiver 38 is not subject to deformity or irregularity in shape due to manufacturing tolerances or manufacturing processes (e.g., molding), and is smoothly and regularly tubular inside. Therefore, pull-pin 22 slides smoothly and freely inside receiver 38 and maintains a generally uniform retention force therewithin caused by resilient deflection of a pair of spring arms 40 which preferably comprise an integral part of pull-pin 22. Further, both the top 14 and main housing 12 define opposing walls 42, 44 respectively which project toward one another when the top 14 is mounted in place upon the main housing 12 (FIG. 6). Walls 42 and 44 preferably have centrally located semicircular reliefs or cutouts to provide a passage way for the end extremity of pull-pin 22, but otherwise directly are in contact with one another on each side of pin 22 when top 14 is in place upon the main housing 12. This helps rigidify the assembled housing structure and also provides an impediment to the passage of moisture or contaminants inside the housing enclosure through the tubular interior of receiver 38.

The mutual alignment and initial securement of housing top 14 with respect to the main housing 12 is preferably accomplished by complementary and interengaging pins and recesses 12a, 12b, and 14a, 14B which may be seen by reviewing FIG. 2–6 inclusive. More particularly, upstanding tubular column 12a defines an internal recess that receives a downwardly-projecting pin 14 formed on top member 14; similarly, main housing 12 has an upstanding post 12b that is receivable within a central recess defined by a downwardly projecting tubular column 14b comprising part of top 14. Once so mounted in place, the top closure 14 and main housing 12 are preferably welded ultrasonically or otherwise joined permanently along their adjoining edges, which extend the entire periphery around the two such housing members except for a pair of very small openings at the rear through which the electrical conductors 20 exit the housing enclosure. These passageways are preferably made sufficiently small to closely accommodate (and preferably slightly pinch) conductors 20, to thereby provide strain relief for them as well as reduce the likelihood of moisture migration into the interior of the housing enclosure, but they are also preferably sealed in a positive manner as well by injecting a sealant (e.g., silicone gel, etc.) into a tubular cavity 46 (see in particular FIG. 6) which surrounds a short length of the conductors 20 at the point where they exit the housing enclosure. Sealant cavity 46 is formed by correspondingly mating channel-shaped walls 46a, 46b formed on a the main housing 12 and top closure 14, respectively, which come into mating registry with one another when top 14 is secured in place.

Pull-pin 22 is preferably an integral one-piece member made by injection molding or the like and formed of a non-conductive generally rigid polymer such as acetal polymer. As already indicated, pull-pin 22 includes an externally accessible bail 24 on one end, by which it may readily be secured (as by a lightweight rope, wire, cable, or other such tether) to the towing vehicle or other such device (referred to broadly as a joined member or component which is joined to another such member or component and whose relative motion is to be detected). In addition, pull-pin 22 preferably includes a circular collar 48 adjacent bail 24 which fits snuggly against the outer end surface of receiver 38 when the pull-pin is fully inserted into the receiver and, adjacent collar 48, a pair of cylindrical sections 50 and 52, the first of which fits snugly inside the end of receiver 38 and the second of which slides inside the latter with minimal clearance when the pull-pin is fully inserted therein (as shown in FIG. 5 for example). Further, pull-pin 24 includes the previously mentioned spring arms 40, which may be formed on opposite sides of the pin and extend part way along its length. Along the major portion of its length, this embodiment of pull-pin 22 has a generally X-shaped or cruciform cross section defined by a pair of mutually orthogonal elongated wall sections 22a, 22b (FIGS. 2–8 inclusive), which may provide longitudinal guiding surfaces with respect to the tubular interior of receiver 38 and the circular central opening defined in housing walls 42 and 44 mentioned previously, through which pin 22 passes to access the self-contained switch unit 26.

In the first embodiment of pull-pin 22 (illustrated and described in FIGS. 2–8), this member has a somewhat conically tapered end extremity 54 which, in the fully inserted position of pin 22, bears directly against and operatively moves an operating member 56 of switch unit 26. In the illustrated embodiment, operating member 56 comprises a rocker member but it could in a broader sense be practically any analogous push-type component, all of which are collectively referred to herein as "a push button." This movement of operating member 56 actuates switch 26 to its normal operating condition which prevails during times when there is no unexpected breakaway or relative motion between the joined components (e.g., towing and towed vehicles). That is, as will be understood, the switch unit 26 includes an internal switching mechanism, e.g., a pair of contacts or the like, which operate to complete or interrupt a path for current flow through the switch unit via conductors 20. Upon relative movement of the joined components, however, pin 22 will be pulled longitudinally outwardly with respect to receiver 38 directly in accordance with the extent to which the joined components (e.g., towing and towed vehicles) have moved apart. If pull-pin 22 is so retracted, at least to the extent shown in FIG. 6 (or further, even to the extent it is fully withdrawn from switch assembly 10), the switch operating member (rocker, etc. 56) immediately moves to its opposite position, in which it actuates the internal switch mechanism to an opposite condition of conductivity, i.e., to either complete or interrupt a circuit path through the switch unit. (As will be understood, switch unit 26 may of either a "normally closed" or "normally opened" circuit configuration, and the operating member 56 should be spring-biased so as to automatically return to its original position (i.e., as shown in FIG. 3) when pin 22 is so withdrawn.)

In this operation, it will be noted that the integral spring arms or fingers 40 of pull-pin 22 function to maintain a positive and predetermined retention force with respect to receiver 38 whereby inadvertent withdrawal of the pull-pin during operation is substantially precluded. No part of pull-pin 22 actually touches or operates the electrical switch contacts or any related electrical switch mechanism inside switch unit 26, contrary to the conventional practice followed heretofore. Thus, switch unit 26 may be of a conventional nature which may be purchased economically in the market place and which has both well-established and consistent actuation characteristics and current-carrying capabilities, unlike the essentially custom-made, complicated spring-like internal contacts heretofore conventionally used in breakaway switches. In addition, switch unit 22 preferably has an enclosing body 32 which protects the internal contacts/switch mechanism of switch unit 26 from moisture or the like even if it does enter the adjacent area, unlikely as that may be due the closely interfitting character of the pull-pin 22 and receiver 38, the adjoining internal housing walls 42 and 44, and the housing flanges or walls 28, 28a, and 30 which interfit closely with the extending flange portions 26a, 26b of switch unit 26. In this regard, an O-ring (not shown in FIGS. 1–8) may be used on pin 22 at the point where it enters receiver 38, to positively seal that area when the pin is in place. As already pointed out, there is little or no likelihood that moisture or other contamination will enter the housing past the electrical terminals 21, since they are disposed within the sealed cavity formed by the closely interfitting housing and top walls 46a, 46b, as well as by the sealant injected into sealant cavity or pocket 46.

FIGS. 9 and 10 illustrate a modified form or alternative embodiment of the pull-pin, designated by the numeral 122, which may be used in a component configuration wherein switch unit 26 is positioned differently within housing 12 (by appropriately reconfigured internal walls, not specifically shown), such that the switch unit 34 is rotated essentially 90° from its position as shown in FIGS. 3–6 inclusive, i.e., with the switch operating member (e.g. rocker 56) disposed essentially parallel to the longitudinal axis of the pull-pin and receiver 38. In this configuration, pin 122 slides across the switch operating member rather than meeting it directly at right angles. In this form, pull-pin 122 has the indicated conical sections 154 which enable it to approach rocker 56 in the manner shown in FIG. 9 and move across it to the position shown in FIG. 10, in which rocker 56 moves from one of its alternative positions to the other, and the opposite happens as pull-pin 122 is withdrawn.

FIG. 11–14 inclusive illustrate another modified form or alternative embodiment of the pull-pin, designated by the numeral 222, which is shown in a configuration analogous to that depicted in FIGS. 1–8 inclusive but also directly usable in the configuration of pull-pin 122, referred to in the preceding paragraph, for use with switch units mounted in the alternative position discussed therein. In the form illustrated, pull-pin 222 comprises an elongated circularly cylindrical member having a rounded protruding forward end 62 for directly abutting contact with switch unit rocker (or push button) 56 in the same manner as pull-pin 22, discussed in connection with FIGS. 1–8 inclusive. Unlike pull-pin 22, pull-pin 222 does not spring arms 40 or the like but instead incorporates a pair of resiliently flexible O-rings 66 and 72 which cooperate with the interior of a slightly different receiver 38a to hold the pull-pin in place therewithin.

Figure 12:
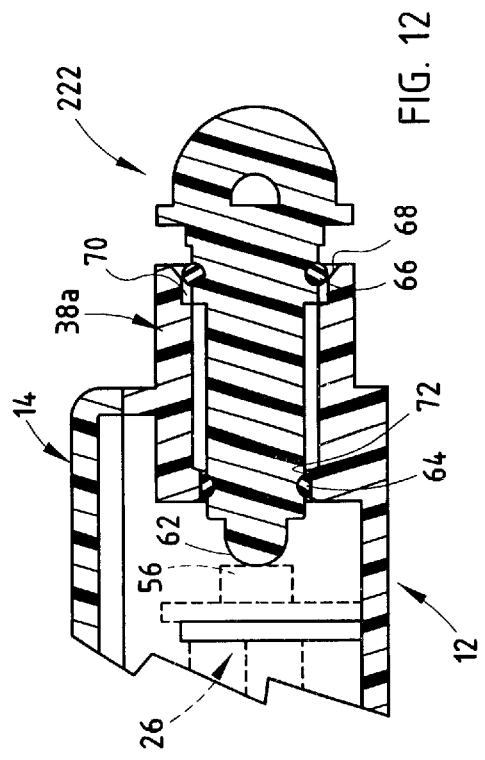
FIGS. 11, 12, and 13 are fragmentary cross-sectional views similar to FIG. 6 but showing a third of the pull-pin in various positions of partial and full insertion.
Figure 14:
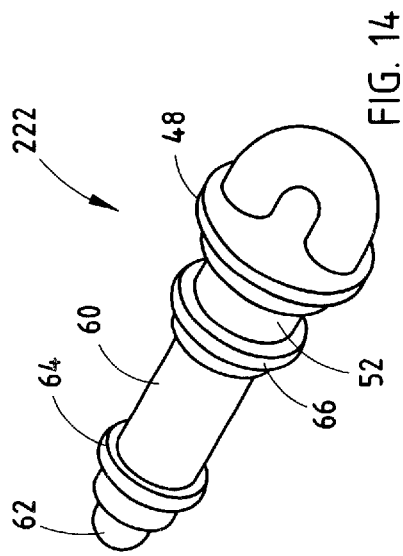
FIG. 14 is a perspective view of the pull-pin embodiment shown in FIGS. 11–13 inclusive.
Figure 11:
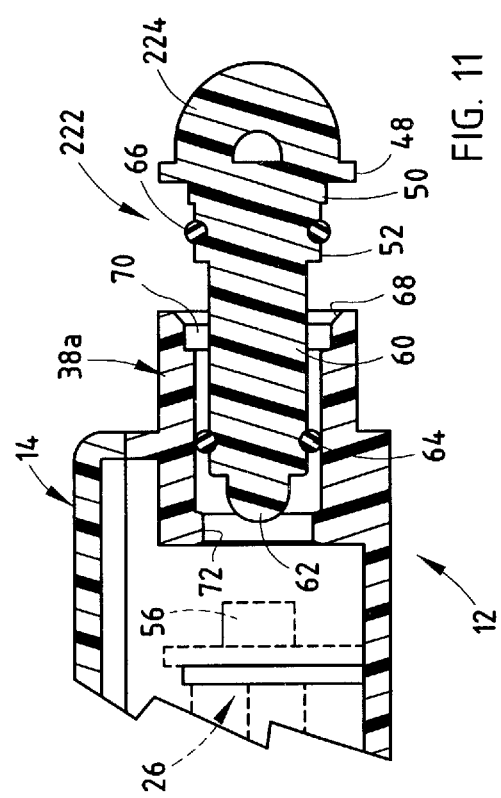
Figure 13:
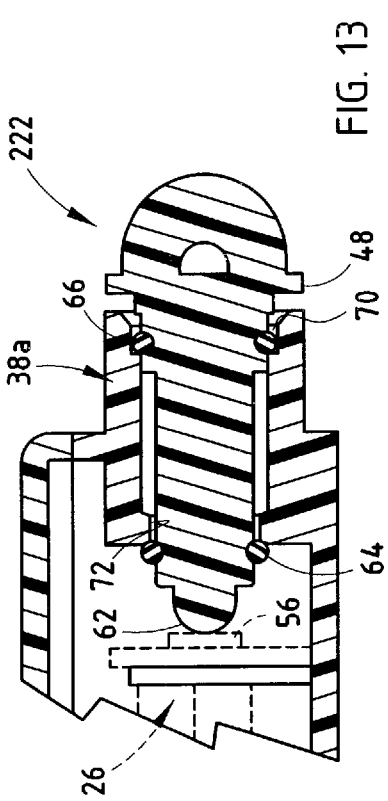

That is, as seen in FIGS. 11, 12, and 13, receiver 38a includes an inwardly projecting annular wall portion 72 which is sized in relation to the outside diameter of pull-pin 222 and its forwardmost O-ring 64 such that O-ring 64 must be compressed (as shown in FIG. 12) in order to slide over the diametral constriction represented by annular flange 72. Upon further insertion of pull-pin 222, O-ring 64 clears the innermost edge of annular flange 72 (as shown in FIG. 13) and at this point its rounded forward end 62 depresses switch unit rocker 56 to cause switching operation of switch unit 26. In this position, pull-pin 222 is resiliently but firmly locked in place in its switch-actuating position, and it will retain itself in this position until forcibly withdrawn from receiver 38a through resilient compression of O-ring 64.

Preferably, pull-pin 22 also includes an outer O-ring 66 which seats in an annular groove formed in the larger cylindrical portion 52 of pull-pin 222 located adjacent its outer flange 48. O-ring 66 compressively fits within a chamber 70 formed immediately inside the outer end extremity of receiver 38a, whose diameter is sized to require resilient compression of O-ring 66 in order to seat it in place therein. To facilitate this process, the entrance to recess 70 in the end of receiver 38a is preferably chamfered or angularly relieved, as indicated by numeral 68. The resilient compression of O-ring 66 when seated within recess 70 also serves a retaining function for pull-pin 222, but its principal purpose is to seal the interior of housing unit 12, 14 from moisture and foreign elements which might otherwise move past the outside of the pull-pin in actual usage. As in the case of pull-pins 22 and 122, pin 222 also preferably includes an outer bail designated 224, by which the pull-pin may readily be connected to the towing vehicle for forced retraction from receiver 38a upon decoupling of the towed vehicle.

The above description is considered that of the preferred embodiments only. Modifications and variations of this and other such embodiments may well occur to those skilled in the art and to those who make or use the invention after learning of it through access to such preferred embodiments. Accordingly, it is to be understood that the embodiments shown in the drawings and described above are merely for illustrative purposes and should not be used to limit the scope of the invention, which is defined by the following claims as interpreted according to the principles of patent law, including the doctrine of equivalents.

The invention claimed is:

1. A breakaway switch assembly to detect decoupling of a towed vehicle from its towing vehicle, comprising:
   a housing enclosure having internal switch-retention members,
   a self-contained switch unit disposed inside said housing enclosure, said switch unit having a movable switch-operating member and mounting surfaces for retaining and positioning said switch unit inside said housing;
   said mounting surfaces engaging said switch-retention members inside said housing enclosure to hold said switch unit in predetermined placement therewithin;
   a signal conductor operably connected to said switch unit to carry a signal conducted through said switch unit, said signal conductor extending out of said housing enclosure; and
   an externally accessible actuator extending into said housing enclosure in alignment with said switch-operating member of said switch unit to actuate said switch-operating member, said actuator having a connector portion to attach said actuator to said towing vehicle and other portions detachably mounted on said housing enclosure, whereby decoupling of said towing and towed vehicles exerts a force on said connector portion to detach said other portions and thereby move said actuator and switch-operating member into and out of a position causing signal conduction through said switch unit, thereby detecting the decoupling of said vehicles from one another.

2. The breakaway switch assembly of claim 1, wherein said self-contained switch unit includes an outer body having portions comprising said mounting surfaces.

3. The breakaway switch assembly of claim 1, wherein said movable switch-operating member comprises a push button.

4. The breakaway switch assembly of claim 3, wherein said push button comprises at least a portion of a rocker member.

5. The breakaway switch assembly of claim 3, wherein said externally accessible actuator member extending into said housing comprises a pull-pin and said pull-pin is removably mounted in said housing enclosure.

6. The breakaway switch assembly of claim 5, wherein said housing includes a passage through which said pull-pin is extendable and which supports said pull-pin in predetermined position.

7. The breakaway switch assembly of claim 1, wherein said internal switch-retention members of said housing and said switch unit mounting surfaces comprise interengageble flange portions.

8. The breakaway switch assembly of claim 1, wherein said self-contained switch unit includes a pair of electrical terminals and said signal conductor comprises a pair of electrical conductors having terminals which are connectable with said switch unit terminals to establish an electrical circuit through said switch unit.

9. The breakaway switch assembly of claim 8, wherein said switch unit includes an outer enclosure and said pair of electrical terminals are operably accessible through said enclosure.

10. The breakaway switch assembly of claim 1, wherein said externally accessible operating member extending into said housing comprises a pull-pin.

11. The breakaway switch assembly of claim 10, wherein said housing includes a passage through which said pull-pin is extendable and which supports said pull-pin in predetermined position.

12. The breakaway switch assembly of claim 11, wherein said pull-pin includes at least one resiliently flexible element engageable with portions of said housing passage with sufficient force to retain said pull-pin in predetermined position with respect thereto.

13. The breakaway switch assembly of claim 12, wherein said at least one resiliently deformable-pull-pin element comprises a spring arm.

14. The breakaway switch assembly of claim 13, wherein said pull-pin and spring arm comprise a one-piece member.

15. The breakaway switch assembly of claim 14, wherein said one-piece member comprises a molded non-conductive polymeric unit.

16. The breakaway switch assembly of claim 12, wherein at least one resiliently flexible pull-pin element comprises an elastomeric member.

17. The breakaway switch assembly of claim 16, wherein said elastomeric member comprises an O-ring.

18. The breakaway switch assembly of claim 1, wherein said housing comprises an enclosing body having peripheral walls, a bottom and a top which together define an interior space, said top and bottom comprising separate pieces connected together.

19. The breakaway switch assembly of claim 18, wherein said enclosing body has a port opening defining a passage through which said actuator extends, said passage and actuator having frictionally engageable portions.

20. The breakaway switch assembly of claim 19, wherein said frictionally engageable portions comprise resiliently deformable sections.

21. The breakaway switch assembly of claim 20, wherein said resiliently deformable sections comprise at least one spring arm.

22. The breakaway switch assembly of claim 21, wherein said spring arm comprises an integral part of said actuator.

23. The breakaway switch assembly of claim 22, wherein said actuator comprises a pull-pin.

24. The breakaway switch assembly of claim 18, wherein said housing defines a passage area through which said signal conductor is extendable to exit said housing, and wherein said passage area includes a walled receptacle providing a pocket for sealant.

25. The breakaway switch assembly of claim 24, wherein said top of said housing body defines part of said passage area.

26. In a breakaway switch assembly of the type having a housing attachable to one of a pair of mutually connected members and a switch mechanism adapted to switchably signal the occurrence of relative movement between said pair of members, the improvement comprising:

an integral self-contained switch unit mountable on said housing and having an operator member for an internal switch mechanism controlled by said operator member, said self-contained switch unit further having terminals to input and output a signal to be switched by said internal switch mechanism and said switch mechanism adapted to selectively complete and interrupt a path for said signal in response to actuation of said operator member;

a switch actuator having a first position in which it actuates said operator member to control said switch mechanism a first way causing a first selective signal path completion/interruption condition and a second position in which it actuates said operator member to control said switch mechanism a second way causing a second and different selective signal path completion/interruption condition; and said switch actuator being attachable to the other of said mutually connected members in said pair so as to move with such other of said members upon movement of that member relative to said one member, and said switch actuator upon undergoing such movement moving from one of said first and second positions to the other thereof.

27. The improvement of claim 26, wherein said switch unit operator member comprises a push button.

28. The improvement of claim 26, wherein said switch unit operator member comprises a rocker member.

29. The improvement of claim 26, wherein switch actuator includes at least one resiliently deflectable portion, and further including a receiver for said switch actuator which has an engagement surface for contact with said resiliently deflectable portion causing resilient deflection thereof sufficient to retain said switch actuator at a predetermined position relative to said receiver in the absence of said movement of the other of said mutually connected members which causes movement of said switch actuator.

30. The improvement of claim 29, wherein said resiliently deflectable portion of said switch actuator comprises a spring arm which is integrally formed with said actuator.

31. The improvement of claim 29, wherein said resiliently deflectable portion of said switch actuator comprises a resiliently compressible element.

* * * * *